United States Patent
Mueller et al.

(10) Patent No.: US 9,850,917 B2
(45) Date of Patent: Dec. 26, 2017

(54) PUMP AUTHORITY SWITCHING APPARATUS FOR A FLUID DISTRIBUTION SYSTEM

(71) Applicants: Austin Wade Mueller, Clinton, WI (US); Carthel C. Baker, Oregon, IL (US); Michael P. Garry, Rockford, IL (US)

(72) Inventors: Austin Wade Mueller, Clinton, WI (US); Carthel C. Baker, Oregon, IL (US); Michael P. Garry, Rockford, IL (US)

(73) Assignee: Woodward, Inc., Fort Collins, CO (US)

( * ) Notice: Subject to any disclaimer, the term of this patent is extended or adjusted under 35 U.S.C. 154(b) by 490 days.

(21) Appl. No.: 14/494,309

(22) Filed: Sep. 23, 2014

(65) Prior Publication Data

US 2016/0084272 A1 Mar. 24, 2016

(51) Int. Cl.
| | |
|---|---|
| F04B 49/22 | (2006.01) |
| F15B 11/02 | (2006.01) |
| F15B 13/044 | (2006.01) |
| B64D 37/34 | (2006.01) |
| F02C 7/236 | (2006.01) |

(52) U.S. Cl.
CPC ............... *F15B 11/02* (2013.01); *B64D 37/34* (2013.01); *F02C 7/236* (2013.01); *F15B 13/044* (2013.01); *F04B 49/225* (2013.01)

(58) Field of Classification Search
CPC .............................. F04B 23/14; F04B 49/225
See application file for complete search history.

(56) References Cited

U.S. PATENT DOCUMENTS

| | | | | |
|---|---|---|---|---|
| 3,498,061 | A  * | 3/1970 | Siegrist | F15B 21/042 60/327 |
| 9,702,301 | B2 * | 7/2017 | Potel | F02C 7/22 |
| 2010/0089026 | A1 | 4/2010 | Baker et al. | |

FOREIGN PATENT DOCUMENTS

| | | |
|---|---|---|
| EP | 1 329 617 A2 | 7/2003 |
| EP | 1 785 348 A2 | 5/2007 |
| GB | 758679 | 10/1956 |

* cited by examiner

*Primary Examiner* — F. Daniel Lopez
(74) *Attorney, Agent, or Firm* — Reinhart Boerner Van Deuren P.C.

(57) ABSTRACT

A fluid distribution system includes a boost supply providing a fluid flow, and a fluid metering system downstream of the boost supply. The fluid metering system supplies fluid to a downstream device. A main fluid pump supplies at least a portion of the fluid flow to the fluid metering system. A shut-off valve is positioned upstream of a main fluid pump inlet. An actuation system is positioned downstream of the boost supply. The actuation system supplies fluid to one or more hydraulically-operated devices. An actuation pump supplies at least a portion of the fluid flow to the fluid metering system and to the actuation system. A first valve is positioned between the actuation pump and the fluid metering system. The first valve and the shut-off valve are operable to switch between the main fluid pump and the actuation pump as a source of fluid supply to the fluid metering system.

6 Claims, 6 Drawing Sheets

PUMP AUTHORITY SWITCHING APPARATUS FOR A FLUID DISTRIBUTION SYSTEM

FIELD OF THE INVENTION

This invention generally relates to fluid distribution systems and, more specifically, fluid distribution systems with means for switching pump authority.

BACKGROUND OF THE INVENTION

Thermal management is often an important issue in fluid distribution systems, for example in the fuel systems of jet engines. Growing electrical generation capacity further increases the thermal loads on the aircraft. It is desirable to dump this excess heat into the fuel stream to conserve energy. The engine fuel pumping system is traditionally comprised of a boost, actuation, main, and augmenter pumps wherein the actuation pump is a variable-displacement, positive-displacement pump and the main fuel pump and the augmenter pump are high-speed centrifugal pumps.

Typically, conventional fuel systems for jet engines have had minimal to no heat capacity at high turndown conditions (i.e., low burn flow) to accommodate the increased heat loads. These conventional fuel systems, and the aircraft on which they are employed, are frequently reported to have limited operability due to thermal loads. Furthermore, the fuel pumps, which are often high-speed centrifugal pumps, may be inefficient and a significant contributor to the fuel heat load at high turndown conditions. It would therefore be desirable to have a system capable of operating at high turndown conditions with reduced fluid heat loading as compared to conventional fluid distribution systems.

Embodiments of the present invention provide such a system. These and other advantages of the invention, as well as additional inventive features, will be apparent from the description of the invention provided herein.

BRIEF SUMMARY OF THE INVENTION

In a particular embodiment, the present invention provides an advanced Fuel Thermal Management System (FTMS) for a jet engine, for example a fighter aircraft jet engine, in which the main fuel pump is a high-speed centrifugal pump having a shut-off valve which is paired with a variable positive displacement high pressure actuation pump. In alternate embodiments, the variable positive displacement pump may be replaced by a fixed positive displacement pump, or any combination of fixed and variable positive displacement pumps.

In particular embodiments of the present invention, a pump switching device utilizes excess capacity of the actuation pump to supply fuel for burn flow at high turndown conditions. At these high turndown conditions, the main fuel pump is shut off, effectively eliminating the main-fuel-pump heat load, thereby increasing the thermal capacity of the fuel system to absorb aircraft heat loads. When the engine fuel and actuation flow demand exceeds the actuation pump capacity, the main fuel pump is brought back online to provide combustor burn flow. At the switch point, the actuation system pressure and main fuel pump pressure can be substantially different, typically with the actuation system pressure being higher than the main fuel pump pressure.

Transferring authority (i.e., the source of fuel supply to the combustor) between the main fuel pump and the actuation pump results in a pressure change at the inlet of the fuel metering system. An abrupt transition could challenge the ability of a typical fuel metering system to maintain stable metered flow as well as the dynamic response of the actuation system pressure regulator and the centrifugal pump. Embodiments of the present invention provide a means to smoothly transition the pressure at the inlet of the metering unit when transferring flow authority between a high-speed centrifugal pump and a fixed-displacement actuation pump.

In one aspect, the invention provides a fluid distribution system that includes a boost supply which provides a fluid flow, and a fluid metering system positioned downstream of the boost supply. The fluid metering system is configured to supply fluid at a minimum pressure to a downstream device. A main fluid pump is configured to supply at least a portion of the fluid flow to the fluid metering system. A shut-off valve is positioned upstream of a main fluid pump inlet. An actuation system is positioned downstream of the boost supply. The actuation system is configured to supply fluid to one or more hydraulically-operated devices. An actuation pump is configured to supply at least a portion of the fluid flow to the fluid metering system and to the actuation system. A first valve is positioned between the actuation pump and the fluid metering system. The first valve and the shut-off valve are operable to switch between the main fluid pump and the actuation pump as a source of fluid supply to the fluid metering system.

In a particular embodiment, the shut-off valve is open and the first valve is closed when the main fluid pump is the source of fluid supply to the fluid metering system, and wherein the shut-off valve is closed and the first valve is open when the actuation pump is the source of fluid supply to the fluid metering system. In certain embodiments, at any time during a transition from the main fluid pump to the actuation pump as the source of fluid supply, or from the actuation pump to the main fluid pump as the source of fluid supply, the fluid metering system maintains a stable fluid flow rate throughout the transition.

In a further embodiment, the fuel metering system is able to maintain a stable flow rate by controlling the initial activation time and flow gain of the first valve and the shut-off valve. In some embodiments, the main fluid pump is a centrifugal pump, and the actuation pump is a fixed or variable positive displacement pump. The first valve may include a piston-type valve member and a biasing element attached to the valve member. In particular embodiments, the first valve and the shut-off valve are both controlled electrically by respective electro-hydraulic servo valves.

Embodiments of the invention may include a second valve positioned between the main fluid pump and the fluid metering system, where the second valve is configured to isolate the main fluid pump from the fluid metering system. The second valve may include a piston-type valve member and a biasing element attached to the valve member, where the second valve references a shut-off valve supply pressure. Alternatively, the second valve may include a piston-type valve member and a biasing element attached to the valve member, wherein the second valve is controlled electrically by an electro-hydraulic servo valve. In certain embodiments, the first valve has a piston-type valve member and a biasing element attached to the valve member, where the first valve references a shut-off valve supply pressure. The first valve may be configured to maintain a first constant pressure drop across the fluid metering system.

Embodiments of the invention may include a second valve positioned between the main fluid pump and the fluid metering system, where the second valve is controlled by an electro-hydraulic servo valve. In a more particular embodiment, the electro-hydraulic servo valve is configured to select a first reference pressure such that second valve is closed when the main fuel pump is not operating, and to select a second reference pressure such that second valve maintains a second constant pressure drop across the fluid metering system when the main fuel pump is operating, the second constant pressure drop being greater than the first constant pressure drop.

In a further embodiment of the invention, a heat exchanger is positioned downstream of the boost supply and upstream of both actuation pump and the shut-off valve.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Several embodiments of the invention described herein relate specifically to fuel distribution systems in jet aircraft. While fuel systems for jet engines represent one of the possible applications for the present invention, one skilled in the art will recognize that the present invention is not limited to these applications. It is envisioned that embodiments of the invention may be suitably employed in a variety of applications where a liquid must be supplied under pressure. Particularly, the systems described and illustrated herein may be described as either fuel distribution system, or more broadly as fluid distribution systems.

Figure 1:
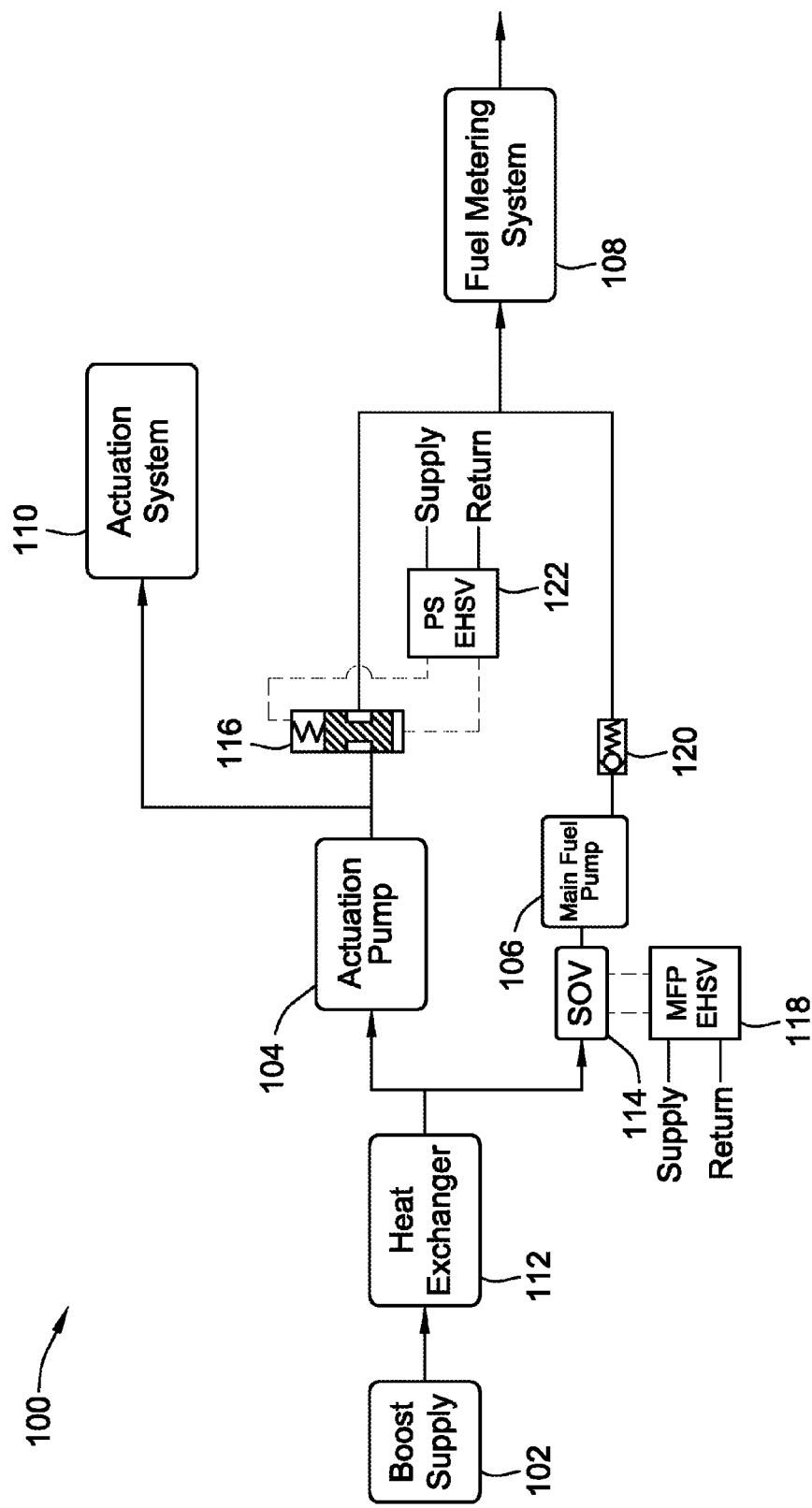
FIG. 1 is a schematic illustration of a fluid distribution system with means for switching pump authority, in accordance with an embodiment of the invention.

In a certain application, the system described herein substantially increases the capacity of the fuel system to absorb aircraft heat loads. This is accomplished by eliminating the heat load of the main fuel pump at high turndown conditions. A particular embodiment of the invention is shown in FIG. 1, which is a schematic illustration of a fluid distribution system 100 with means for switching pump authority, constructed in accordance with an embodiment of the invention. The fluid distribution system 100 includes a boosts supply pump 102 that supplies a flow of liquid to an actuation pump and to a main fluid pump 106. In a fuel system application, such as used with jet engines, the main fluid pump is referred to as main fuel pump 106, which, in some embodiments, is a high-speed centrifugal main fuel pump to provide fuel to the fuel metering system 108. The terms "main fluid pump" and "main fuel pump" are used interchangeably below, as are the terms "fluid distribution system" and "fuel distribution system". The actuation pump 104 may be a positive-displacement actuation pump 104 which supplies flow to the actuation system 110. In particular embodiments of the invention, an optional heat exchanger 112 may be positioned downstream of the boost supply pump 102 and upstream of the actuation pump 102 and main fuel pump 106.

The fluid distribution system 100 includes a pump switching system which connects the actuation pump 104 to the fuel metering system 108 in response to a command, such as a control signal. The high-speed centrifugal main fuel pump 106 is designed such that it can be shut off and the core drained in response to a command to a shut-off valve 114, reducing power input to near zero. In particular embodiments, the shut-off valve 114 is controlled by a first electro-hydraulic servo valve (EHSV) 118. In this manner, an electrical signal supplied to the first EHSV 118 controls operation of the shut-off valve 114. The actuation pump 104 is shown as a variable positive-displacement pump. Alternatively, the variable positive-displacement pump may be replaced by a fixed positive-displacement pump or any combination of fixed and variable positive-displacement pumps.

As shown in FIGS. 1-6, both the actuation pump 104 and main fuel pump 106 are supplied by the engine boost system 102 and heat exchanger 112. In the context of the present invention, the configuration of the boost system pump 102 and location of the heat exchanger 112 in the system is not particularly relevant. Likewise, the configuration of the actuation system 110 and fuel metering system 108 may vary depending on the application. For example, a military engine may require an augmenter system which is not shown.

In the systems described herein, at high turndown conditions (e.g., idle, cruise), the main fuel pump 106 is shut off and the fuel metering system 108 is supplied by the actuation pump 104. When the engine fuel and actuation flow demand exceed the actuation pump capacity, the main fuel pump 106 is brought back online to provide combustor burn flow, and the pump switching system isolates the actuation pump 104 from the fuel metering system 108. The fluid distribution system 100 eliminates the waste heat from the main fuel pump 106, which substantially increases the capacity of the fuel system 100 to absorb aircraft heat loads. This concept also increases operability at low flow conditions by reducing the amount of heat returned to the fuel tank.

In the embodiments described herein, both the actuation pump 104 and main fuel pump 106 are supplied by the engine boost system pump 102 and heat exchanger 112. In the context of the present invention, configuration of the boost system pump 102 and location of the heat exchanger 112 in the fluid distribution system 100 is not necessarily relevant. Likewise, the configuration of the actuation system 110 and fuel metering system 108 will vary depending on the particular application. At high turndown conditions (e.g., idle, cruise), the main fuel pump 106 is shut off and the fuel metering system 108 is supplied by the actuation pump 104. When the engine fuel flow and actuation flow demands exceed the actuation pump capacity, the main fuel pump 104 is brought back online to provide combustor burn flow, and the pump switching system isolates the actuation pump 104 from the fuel metering system 108. The fluid distribution system 100 eliminates the waste heat from the main fuel pump 106, which substantially increases the capacity of the fuel system 100 to absorb aircraft heat loads. This concept also increases operability at low flow conditions by reducing the amount of heat returned to the fuel tank.

The combination of valves described herein satisfies the requirements for, and is a specific implementation of, the aforementioned pump switching system. The fluid distribution system 100 includes a first pump switching valve 116 between the discharge of the actuation pump 104 and inlet of the metering system 108 along with a first electro-hydraulic servo valve 122 (EHSV), which controls the first pump switching valve 116 in response to an electric command signal. In a first position, this first pump switching valve 116 connects the actuation pump 104 discharge flow to the fuel metering system 108 inlet. In a second position, the first pump switching valve 116 isolates the actuation pump 104 from the fuel metering system 108. When transitioning between the first and second positions, the first pump switching valve 116 controls the flow rate of fluid/fuel with respect to time from the actuation pump 104 to the fuel metering system 108. The position of the first pump switching valve 116 is commanded by the engine control in conjunction with the commanded position of the main fuel pump shutoff valve 114. The timing of each command as well as the flow gain, which is the rate of change in flow rate with respect to time, controlled by port gain and slew rate, of each valve is designed such that pressure transition at the inlet of the fuel metering system 108 does not result in an unacceptable flow disturbance.

Transition from main fuel pump 106 OFF to main fuel pump 106 ON occurs in the following sequence in response to a command from the engine control. Starting at a high turndown condition (e.g., ground idle) the main fuel pump 106 is shut off and the first pump switching valve 116 is in the first position. The main fuel pump shut-off valve 114 starts to open in response to the engine control command. The main fuel pump 106 starts to build pressure consistent with its dynamic response profile. Initially, the main fuel pump 106 is not supplying flow since the fuel metering unit 108 supply pressure is higher than the main fuel pump 106 discharge pressure thereby closing the main fuel pump discharge check valve 120. As the main fuel pump 106 is coming online, the first pump switching valve 116 is commanded to close. As the first pump switching valve 116 closes, the port area is reduced, restricting flow thereby causing fuel metering unit 108 supply pressure to drop. The fuel metering unit 108 supply pressure rate of change is controlled such that the fuel metering system 108 is not substantially impacted.

When the main fuel pump 106 discharge pressure exceeds the fuel metering system 108 supply pressure, the main fuel pump discharge check valve 120 opens, and the main fuel pump 106 is now able to supply flow to the fuel metering unit 108. To complete the transition, the first pump switching valve 116 reaches position two closing off the actuation pump 104 from the fuel metering system 106. This description describes one particular embodiment of the system. Transition from main fuel pump 106 ON to main fuel pump 106 OFF occurs in the following sequence in response to a command from the engine control (not shown). Starting at a condition with the main fuel pump 106 ON and the first pump switching valve 116 is in the second position. The first pump switching valve 116 starts to open to the first position in response to a command from the engine control. As the first pump switching valve 116 opens, the port area is increased, allowing the actuation pump 104 to start supplying a portion of the flow to the fuel metering system 108. The main fuel pump shut-off valve 114 is then commanded to close, causing the main fuel pump 106 discharge pressure to decay in accordance with its response profile.

When the main fuel pump 106 discharge pressure is less than the fuel metering system 108 supply pressure provided through first pump switching valve 116, the main fuel pump discharge check valve 120 closes. The fuel metering system 108 supply pressure rate of change is controlled such that the fuel metering system 108 is not substantially impacted. The actuation pump 104 is now supplying the fuel metering system 108, and the main fuel pump 106 is shut off. Design of the switching system including relative valve timing, slew rates and port gains are dependent on the dynamic characteristics of the fuel metering system 108, main fuel pump 106, and actuation pump pressure regulator.

Figure 2:
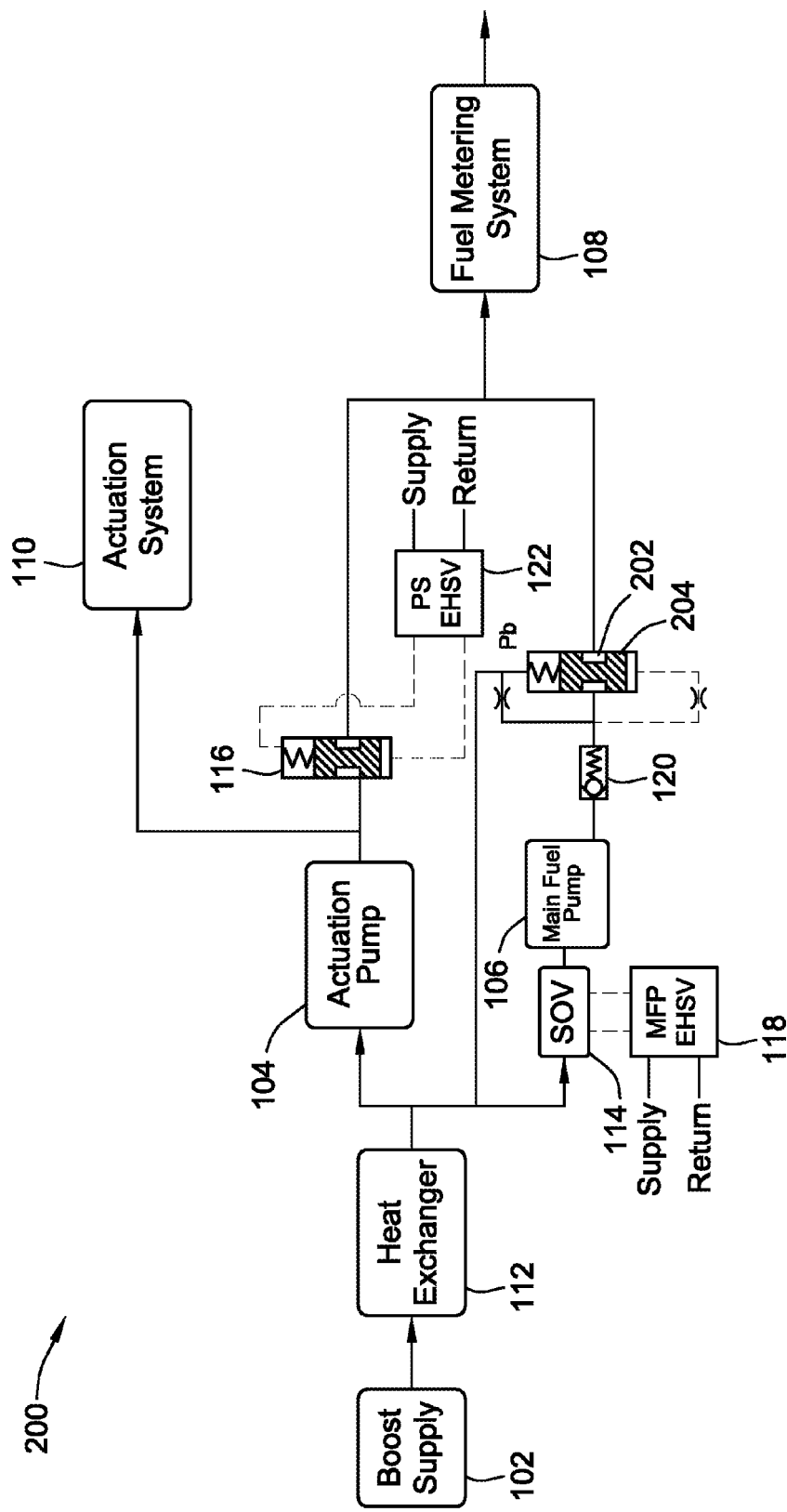
FIG. 2 is a schematic illustration of a fluid distribution system with means for switching pump authority, in accordance with an alternate embodiment of the invention.

In some systems turning the main fuel pump 106 on may create a pressure pulsation that propagates through the fuel metering system 108 causing unacceptable disturbances in metered flow. FIG. 2 is a schematic illustration of a fluid distribution system 200 with means for switching pump authority, in accordance with an embodiment of the invention. As illustrated by FIG. 2, in order to limit the effect of the pressure pulsation on metered flow, the discharge flow from the main fuel pump 106 can be isolated from the fuel metering system 108 by a second pump switching valve 202. When the main fuel pump 106 is shut down the second pump switching valve 202 isolates the main fuel pump 106 from the fuel metering system 108. Both ends of the valve spool 204 or piston, in the second pump switching valve 202, are at boost pressure and the force of the biasing spring 206 sets the valve position. When the main fuel pump 106 is turned on, the pressure at the inlet of the second pump switching valve 202 is raised as well as the pressure acting axially on the end of the spool 204 opposite the spring 206, opening the valve 202. The valve slew rate is controlled by an orifice, and the flow rate of change is controlled by valve slew rate and port flow gain.

Figure 3:
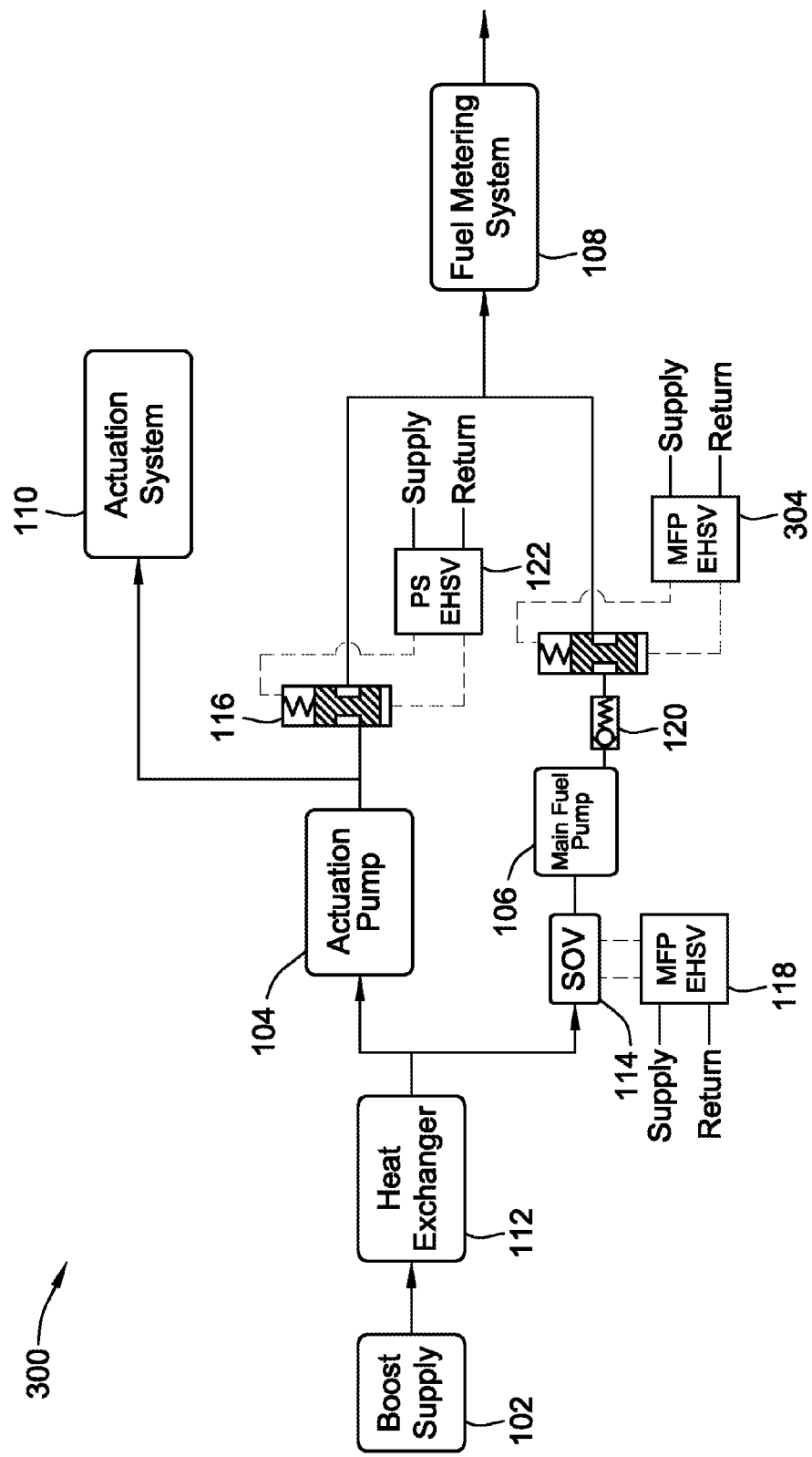
FIG. 3 is a schematic illustration of a fluid distribution system with means for switching pump authority, in accordance with another embodiment of the invention.

FIG. 3 is a schematic illustration of a fluid distribution system 300 with means for switching pump authority, in accordance with another embodiment of the invention. The fluid distribution system 300 is similar to the fluid distribution system 200 of FIG. 2, except that the second pump switching valve 302 of fluid distribution system 300 is controlled by a third EHSV 304, which controls both the timing and the slew rate of the second pump switching valve 302. Thus, the second pump switching valve 302 is operated via an electrical command signal similar to those used to control the shut-off valve 114 and the first pump switching valve 116.

Figure 4:
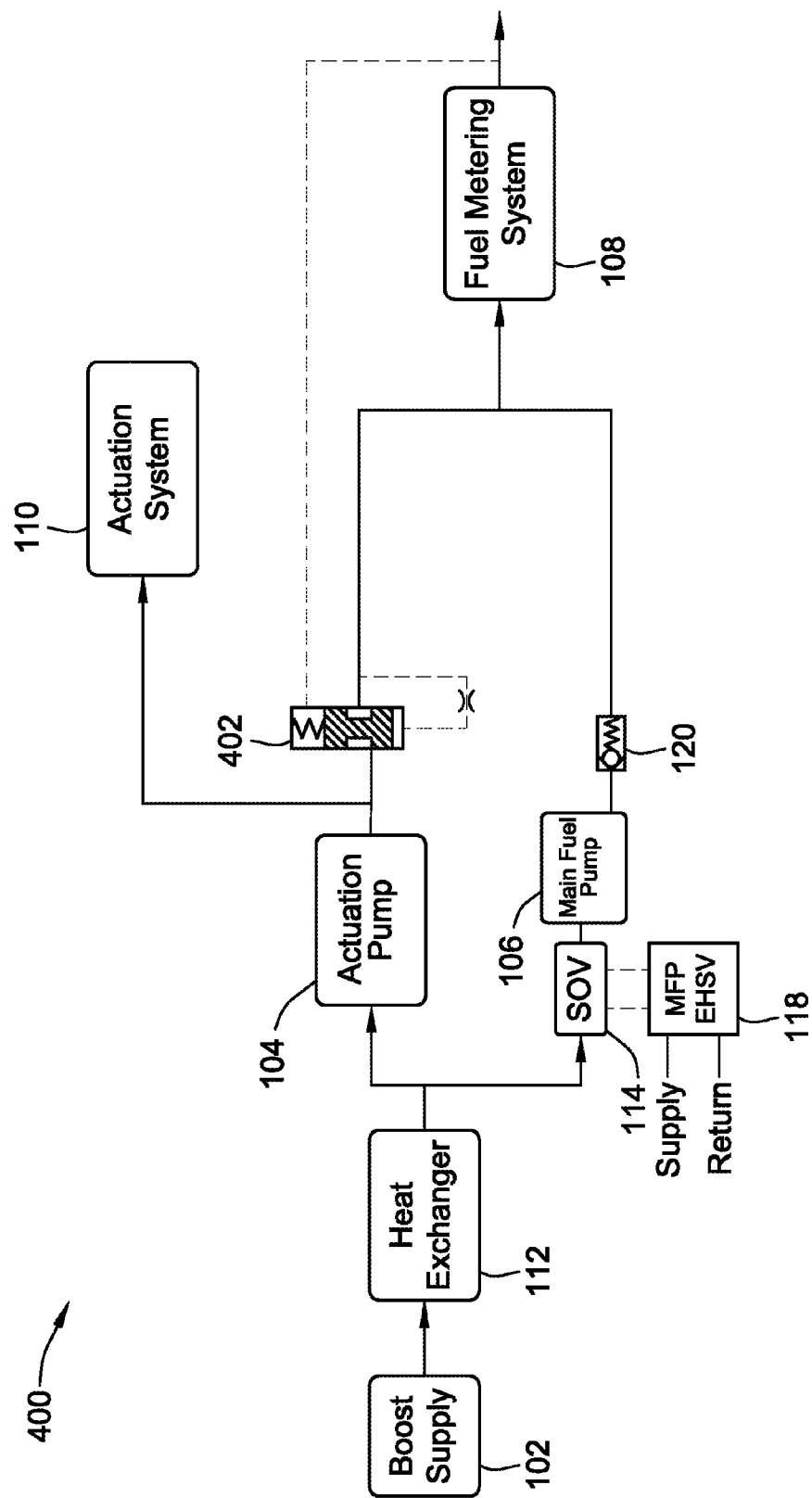
FIG. 4 is a schematic illustration of a fluid distribution system with means for switching pump authority, in accordance with yet another embodiment of the invention.

In some systems it is desirable to maintain a higher pressure for the actuation system 110 and a lower pressure at the inlet of the fuel metering system 108. FIG. 4 is a schematic illustration of a fluid distribution system 400 with means for switching pump authority, in accordance with yet another embodiment of the invention. In this case, the fluid distribution system 400 includes a first pump switching valve 402 that is a pressure regulator, as shown in FIG. 4. In this case, the reference pressure is taken downstream of the fuel metering system 108 and upstream of the fuel manifold (not shown). The first pump switching valve 402 maintains a constant pressure drop across the fuel metering system 108, thus limiting the effect of actuation transients on metered flow.

Figure 5:
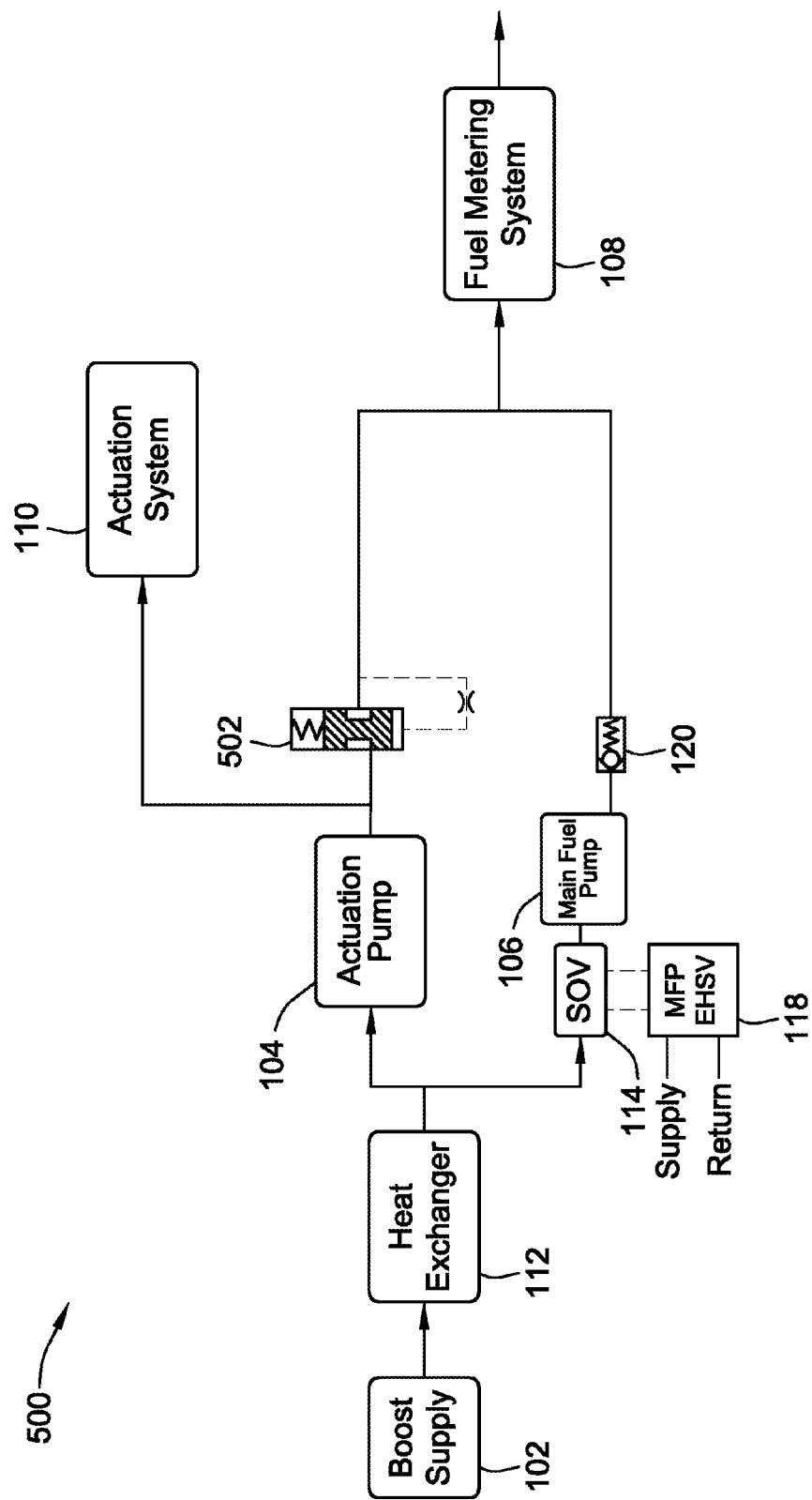
FIG. 5 is a schematic illustration of a fluid distribution system with means for switching pump authority, in accordance with another embodiment of the invention.

FIG. 5 is a schematic illustration of a fluid distribution system 500 with means for switching pump authority, in accordance with another embodiment of the invention. The fluid distribution system 500 of FIG. 5 is similar to the system 100 of FIG. 1, except that, in the system 500 of FIG. 5, the first pump switching valve 502 is tied to two reference pressures rather than to an EHSV. As shown in FIG. 5, one end of the first pump switching valve 502 is tied to the system boost pressure Pb, while the other end is tied to the supply pressure of the fuel metering system 108. This has the effect of closing the first pump switching valve 502 when the system boost pressure Pb increases with respect to the supply pressure of the fuel metering system 108, and opening the first pump switching valve 502 when the system boost pressure Pb decreases with respect to the supply pressure of the fuel metering system 108.

Figure 6:
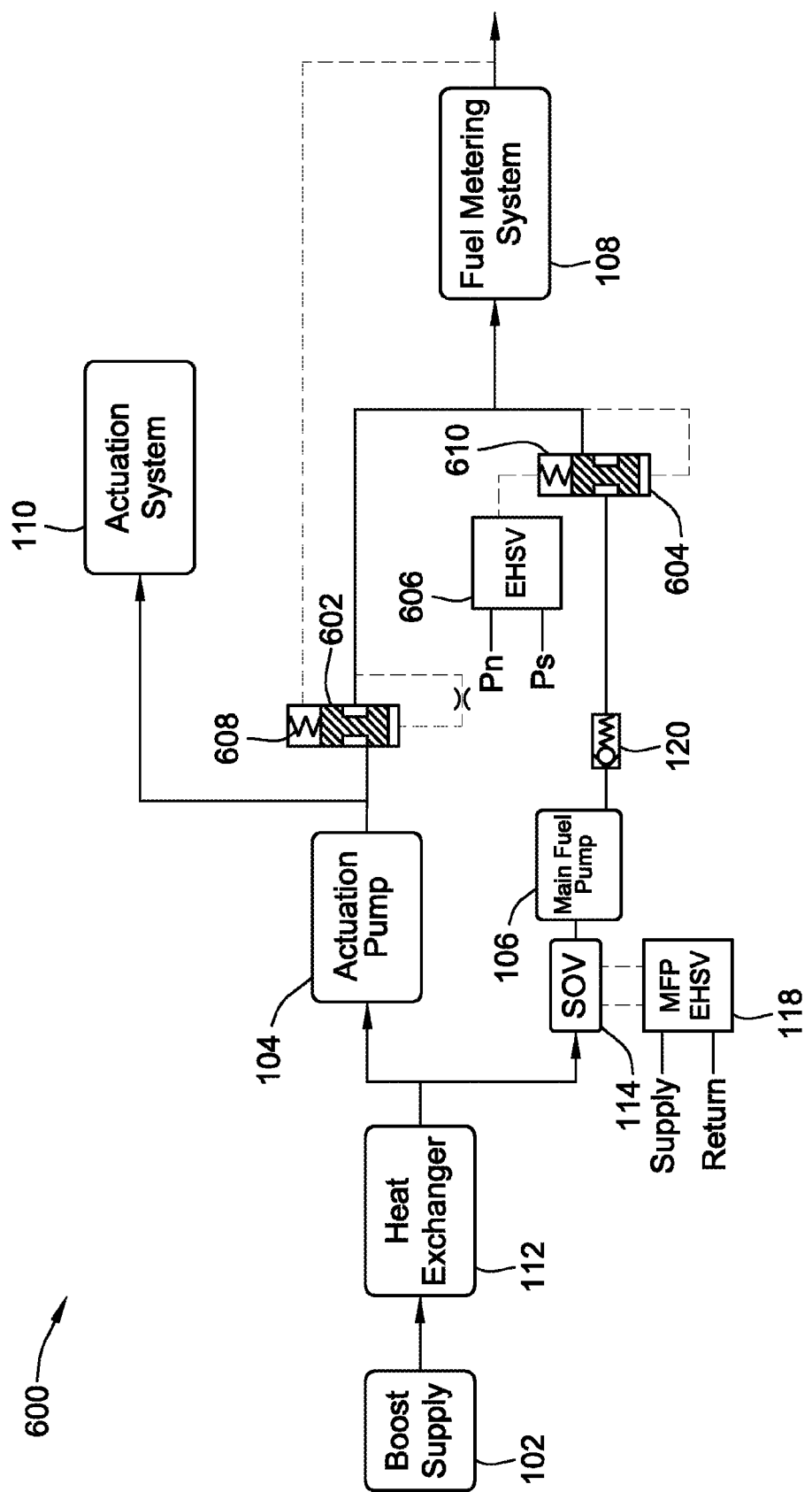
FIG. 6 is a schematic illustration of a fluid distribution system with means for switching pump authority, in accordance with still another embodiment of the invention.

In some instances, it may be necessary to limit the rate of change in the fuel metering system 108 inlet pressure when transferring pump authority. FIG. 6 is a schematic illustration of a fluid distribution system 600 with means for limiting the rate of change in the fuel metering system 108 when switching pump authority, in accordance with an embodiment of the invention. The fluid distribution system 600 includes a first pump switching valve 602 tied to two reference pressures, and includes a second pump switching valve 604 controlled by second EHSV 606. In this embodiment, both the actuation pump 104 supply and the main fuel pump 106 supply are regulated with the same reference pressure (downstream of the fuel metering system 108 as shown). The change in the fuel metering system 108 supply pressure is limited only to the delta between the biasing spring 608 of the first pump switching valve 602, and the biasing spring 610 of the second pump switching valve 604. In certain embodiments, second pump switching valve 604 is configured to maintain a greater pressure drop across the fuel metering system 108 than the pressure drop maintained by the first pump switching valve 602 across the fuel metering system 108.

For the system shown in FIG. 6, the fuel metering system 108 is supplied by the actuation pump 104 when the main fuel pump 106 is turned off. The reference pressure is set, by the second EHSV 606, to Ps on the second pump switching valve 604, which drives it closed. The first pump switching valve 602 sets Ps to a fixed level above Pn to regulate the actuation pump 104 supply. When the main fuel pump 106 is turned on, the reference pressure on the second pump switching valve 604 is changed, by the second EHSV 606, from Ps to Pn. The second pump switching valve 604 regulates Ps to a fixed level above Pn, which is just greater than the first pump switching valve 602 regulating pressure. The second pump switching valve 604 opens at a rate such that the disturbance to Ps is controlled and increases Ps to the higher setting. As Ps increases, the first pump switching valve 602 is closed, isolating the actuation pump 104 from the fuel metering system 108.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fluid distribution system comprising:
a boost supply which provides a fluid flow;
a fluid metering system positioned downstream of the boost supply, the fluid metering system configured to supply fluid at a minimum pressure to a downstream device;
a main fluid pump configured to supply at least a portion of the fluid flow to the fluid metering system, a shut-off valve positioned upstream of a main fluid pump inlet;
an actuation system positioned downstream of the boost supply, the actuation system configured to supply fluid to one or more hydraulically-operated devices;
an actuation pump configured to supply at least a portion of the fluid flow to the fluid metering system and to the actuation system;
a first valve positioned between the actuation pump and the fluid metering system, wherein the first valve and the shut-off valve are operable to switch between the main fluid pump and the actuation pump as a source of fluid supply to the fluid metering system;
wherein the shut-off valve is open and the first valve is closed when the main fluid pump is the source of fluid supply to the fluid metering system, and wherein the shut-off valve is closed and the first valve is open when the actuation pump is the source of fluid supply to the fluid metering system;
wherein, at any time during a transition from the main fluid pump to the actuation pump as the source of fluid supply, or from the actuation pump to the main fluid pump as the source of fluid supply, the fluid metering system maintains a stable fluid flow rate throughout the transition; and wherein the fuel metering system maintains stable metered flow rate by controlling the initial activation time and flow gain of the first valve and the shut-off valve.

2. A fluid distribution system comprising:
a boost supply which provides a fluid flow;
a fluid metering system positioned downstream of the boost supply, the fluid metering system configured to supply fluid at a minimum pressure to a downstream device;
a main fluid pump configured to supply at least a portion of the fluid flow to the fluid metering system, a shut-off valve positioned upstream of a main fluid pump inlet;
an actuation system positioned downstream of the boost supply, the actuation system configured to supply fluid to one or more hydraulically-operated devices;
an actuation pump configured to supply at least a portion of the fluid flow to the fluid metering system and to the actuation system;
a first valve positioned between the actuation pump and the fluid metering system, wherein the first valve and the shut-off valve are operable to switch between the main fluid pump and the actuation pump as a source of fluid supply to the fluid metering system; wherein the main fluid pump comprises a centrifugal pump.

3. A fluid distribution system comprising:
a boost supply which provides a fluid flow;
a fluid metering system positioned downstream of the boost supply, the fluid metering system configured to supply fluid at a minimum pressure to a downstream device;
a main fluid pump configured to supply at least a portion of the fluid flow to the fluid metering system, a shut-off valve positioned upstream of a main fluid pump inlet;
an actuation system positioned downstream of the boost supply, the actuation system configured to supply fluid to one or more hydraulically-operated devices;
an actuation pump configured to supply at least a portion of the fluid flow to the fluid metering system and to the actuation system;
  a first valve positioned between the actuation pump and the fluid metering system, wherein the first valve and the shut-off valve are operable to switch between the main fluid pump and the actuation pump as a source of fluid supply to the fluid metering system;
wherein the first valve and the shut-off valve are both controlled electrically by respective electro-hydraulic servo valves.

4. A fluid distribution system comprising:
a boost supply which provides a fluid flow;
a fluid metering system positioned downstream of the boost supply, the fluid metering system configured to supply fluid at a minimum pressure to a downstream device;
a main fluid pump configured to supply at least a portion of the fluid flow to the fluid metering system, a shut-off valve positioned upstream of a main fluid pump inlet;
an actuation system positioned downstream of the boost supply, the actuation system configured to supply fluid to one or more hydraulically-operated devices;
an actuation pump configured to supply at least a portion of the fluid flow to the fluid metering system and to the actuation system;
  a first valve positioned between the actuation pump and the fluid metering system, wherein the first valve and the shut-off valve are operable to switch between the main fluid pump and the actuation pump as a source of fluid supply to the fluid metering system;
wherein the first valve is configured to maintain a first constant pressure drop across the fluid metering system.

5. The fluid distribution system of claim 4, further comprising a second valve positioned between the main fluid pump and the fluid metering system, wherein the second valve is controlled by an electro-hydraulic servo valve.

6. The fluid distribution system of claim 5, wherein the electro-hydraulic servo valve is configured to select a first reference pressure such that second valve is closed when the main fuel pump is not operating, and to select a second reference pressure such that second valve maintains a second constant pressure drop across the fluid metering system when the main fuel pump is operating, the second constant pressure drop being greater than the first constant pressure drop.

* * * * *